United States Patent
Lee (10) Patent No.: US 12,493,279 B2
(45) Date of Patent: Dec. 9, 2025

(54) MANAGEMENT DEVICE FOR SUBSTRATE PROCESSING SYSTEM AND MANAGEMENT METHOD FOR SUBSTRATE PROCESSING SYSTEM

(71) Applicant: SEMES CO., LTD., Cheonan-si (KR)

(72) Inventor: Man Gyu Lee, Daegu (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 455 days.

(21) Appl. No.: 18/061,247

(22) Filed: Dec. 2, 2022

(65) Prior Publication Data
US 2023/0205174 A1  Jun. 29, 2023

(30) Foreign Application Priority Data
Dec. 27, 2021 (KR) .................. 10-2021-0189005
Nov. 9, 2022 (KR) .................. 10-2022-0149033

(51) Int. Cl.
G05B 19/4099 (2006.01)
(52) U.S. Cl.
CPC .............. *G05B 19/4099* (2013.01); *G05B 2219/45031* (2013.01)
(58) Field of Classification Search
CPC .............. G05B 19/4099; G05B 2219/45031
See application file for complete search history.

(56) References Cited

U.S. PATENT DOCUMENTS

2010/0051692 A1* 3/2010 Knudson .............. H05K 9/0067
  324/457
2021/0253362 A1* 8/2021 Oh .................... H01L 21/67733

FOREIGN PATENT DOCUMENTS

KR  10-2014-0075059 A  6/2014
KR  10-2019-0083152 A  7/2019

* cited by examiner

*Primary Examiner* — Gary Collins
(74) *Attorney, Agent, or Firm* — Harness, Dickey & Pierce, P.L.C.

(57) ABSTRACT

A management device for a substrate processing system and a management method for the substrate processing system are provided to allow an operation work in charge of an overhead hoist transport (OHT) control system to know an inspection work end state using an inspection work state, when an inspector performs inspection work of a manufacturing facility using an OHT. The management device includes a tag for inspector that transmits location information for inspector, a repeater that interworks with the tag for inspector to relay the location information for inspector, and an OHT control system including a location information converter that interworks with the repeater to receive the location information for inspector and converts the location information for inspector into location coordinates for inspector.

12 Claims, 3 Drawing Sheets

MANAGEMENT DEVICE FOR SUBSTRATE PROCESSING SYSTEM AND MANAGEMENT METHOD FOR SUBSTRATE PROCESSING SYSTEM

CROSS-REFERENCE TO RELATED APPLICATIONS

This application claims priority under 35 U.S.C. § 119 to Korean Patent Application No. 10-2021-0189005 filed on Dec. 27, 2021 and Korean Patent Application No. 10-2022-0149033 filed on Nov. 9, 2022, in the Korean Intellectual Property Office, the disclosures of which are incorporated by reference herein in their entireties.

BACKGROUND

Embodiments of the present disclosure described herein relate to a management device for a substrate processing system and a management method for the substrate processing system, and more particularly, relate to a management device for the substrate processing system to manage an overhead hoist transport (OHT) and a semiconductor manufacturing facility and a management method for the substrate processing system.

A semiconductor manufacturing technology corresponds to the rapidly changing speed of technological innovation and the rapidly changing environment as technology-intensive future technologies are converged with each other. Particularly, as the degree of integration of semiconductor devices increases and high-performance products are developed, even logistics technology in the semiconductor manufacturing process is pursuing more efficient technology.

Such semiconductor manufacturing logistics flow is managed according to the site situation by means of bottleneck resolution, facility failure improvement, preventive maintenance (PM), and the like.

According to the semiconductor manufacturing logistics flow, a semiconductor fab performs various logistics transport using an overhead hoist transport (OHT).

Such OHTs operate in large quantities on the rail. To control and manage the OHTs, there is an OHT control system which controls and manages all the OHTs.

In this case, to inspect a semiconductor manufacturing facility, an inspector discusses a work start time, a work end time, and a work section with an operation work in charge of the OHT control system. The operation manager in charge of the OHT control system sets the work section to a lane-cut state on a control panel of the OHT control system such that the OHT does not enter the work section of the semiconductor manufacturing facility during the discussed work start time and the discussed work end time, thus preparing a safety device on the system such that the inspector does not collide with OHTs upon work progress.

Thereafter, the inspector installs a reflector at a start point and an end point of the work section, such that a LiDAR sensor recognizes the reflector as an obstacle to perform avoidance driving when another OHT approaches the work section, and prepares a physical safety device.

Next, the inspector installs a ladder or rolling tower and rides the ladder or rolling tower to inspect the facility.

Next, completing the inspection work of the facility, the inspector removes the reflector, descends from the ladder or rolling tower, and proceeds with work for moving the ladder or rolling tower to another place.

Next, the inspector moves to the operation worker in charge of the OHT control system to notify the operation worker that the inspection work is finished. The operation worker in charge of the OHT control system manipulates the control panel to release the lane-cut setting of the work section.

As such, the inspector should proceed with very many steps depending on a safety rule procedure from work start to work end, when inspecting a manufacturing facility using the existing OHT. Particularly, when the inspector moves to the operation worker in charge of the OHT control system after ending the inspection work, because most OHT control systems are installed and operated on the floor below the floor where semiconductor manufacturing facilities are arranged along with power facilities and the like, the inspector should travel a very long distance.

Thus, because the operation worker in charge of the OHT control system does not know that the inspection is finished while the inspector which completes the inspection moves to another floor, he or she should set the inspection section to a lane-cut state. This causes a problem of lowering the logistics transport efficiency. Particularly, when the inspector does not notify the operation worker in charge of the OHT control system of a situation for inspection completion, this causes a problem of further lowering the logistics transport efficiency.

Meanwhile, when the inspector inspects the OHT, there is a need for products for inspection such as equipment for inspector protection, parts, measuring instruments, and tools necessary for inspection. Such products for inspection are stored and operated in storage areas inside the factory where semiconductor manufacturing facilities are installed.

In this case, because the products for inspection stored in the storage area are used by anyone who enters the semiconductor manufacturing plant, they are often moved to a storage area of another point different from the storage area at the first use point after use.

Because it is difficult for the field operator who manage parts or tools to know where the products for inspection are located in the storage area due to this and he or she should move to the storage areas and find the products for inspection, so it is difficult to manage the products for inspection.

SUMMARY

Embodiments of the present disclosure provide a management device for a substrate processing system to allow an operation worker in charge of an OHT control system to know an inspection work end state in real time using an inspection work state when an inspector performs inspection work of a manufacturing facility using an OHT and a management method for the substrate processing system.

Embodiments of the present disclosure provide a management device for a substrate processing system to allow an inspector or a field operator to know a location of a product for inspection in real time and a management method for the substrate processing system.

According to an embodiment, an overhead hoist transport (OHT) control system may include a tag for inspector that transmits location information for inspector, a repeater that interworks with the tag for inspector to relay the location information for inspector, and an overhead hoist transport (OHT) control system including a location information converter that interworks with the repeater to receive the location information for inspector and converts the location information for inspector into location coordinates for inspector.

According to an embodiment, the repeater may be composed of a plurality of repeaters, each of which includes location coordinates for repeater. The location information converter may convert the location information for inspector into the location coordinates for inspector by means of an intersection point of relative distances from the tag for inspector on location coordinates for each of the plurality of repeaters.

According to an embodiment, the OHT control system may further include a display panel that displays the location coordinates for inspector in a map and output a rail for each section and a semiconductor manufacturing facility in the form of graphics in the map.

According to an embodiment, the OHT control system may further include a map interworking unit that interworks with the location information converter to receive location coordinates for inspector on an intersection point where three circular paths intersect with each other and outputs the received location coordinates for inspector on the intersection point on the map in the form of a graphic icon.

According to an embodiment, the management device may further include a tag for inspection product coupled to an inspection product to provide location information for inspection product to the repeater. The location information converter may convert the location information for inspection product into location coordinates for inspection product.

According to an embodiment, the repeater may be composed of a plurality of repeaters, each of which includes location coordinates for repeater. The location information converter may convert the location information for inspection product into the location coordinates for inspection product by means of an intersection point of relative distances from the tag for inspection product on location coordinates for each of the plurality of repeaters.

According to an embodiment, the OHT control system may further include a display panel that displays the location coordinates for inspection product in a map and outputs a rail for each section and a semiconductor manufacturing facility in the form of graphics in the map.

According to an embodiment, the OHT control system may further include an inspection scheduling operation unit that sets lane cut such that an OHT does not operate during an inspection start time and an inspection completion time in a work section within an inspection time, when setting the inspection start time, the inspection completion time, and the work section.

According to an embodiment, the OHT control system may further include a departure alarm unit that interworks with the location information converter to receive location coordinates for inspector, the location coordinates being provided from the tag for inspector, interworks with the inspection scheduling operation unit to receive inspection section location coordinates of an inspection section where an inspector will perform inspection work, and generates an inspector departure alarm on a display panel, when the location coordinates for inspector deviate from a certain range of the inspection section location coordinates.

According to an embodiment, the tag for inspector may further include a power switch, may transmit the location information for inspector when the power switch is turned on, and may stop transmitting the location information for inspector when the power switch is turned off.

According to an embodiment, the OHT control system may further include a work end monitoring unit that monitors whether the tag for inspector is turned on and location coordinates for inspector are input in real time and allows the location coordinates for inspector not to be output on a display panel when the tag for inspector is turned off and the location coordinates for inspector are not input in real time.

According to an embodiment, the work end monitoring unit may receive information about a normal driving state or an abnormal driving state of a semiconductor manufacturing facility and may display the received information on the display panel.

According to another embodiment, a management method for a substrate processing system may include setting, by an inspection scheduling operation unit, an inspection start time and an inspection completion time such that an OHT does not enter the vicinity of a manufacturing facility to be inspected and performing, by the inspection scheduling operation unit, lane cut of the OHT during the inspection start time and the inspection completion time, interworking, by an OHT control system, with a repeater to receive location information for inspector of a tag for inspector, converting, by a location information converter, the location information for inspector, the location information being provided from the tag for inspector, into location coordinates for inspector in a map, and forming location coordinates for inspector of the tag for inspector in the form of a graphic icon on the map and outputting the location coordinates for inspector on a display panel.

According to an embodiment, the management method may further include comparing, by a departure alarm unit, the location coordinates for inspector with inspection section location coordinates where an inspector will perform inspection work, in a state where the departure alarm unit receives the location coordinates for inspector from the location information converter and interworks with the inspection scheduling operation unit to receive the inspection section location coordinates, and generating, by the departure alarm unit, an inspector departure alarm on the display panel, when the location coordinates for inspector deviate from a certain range of the inspection section location coordinates.

According to an embodiment, the management method may further include monitoring, by a work end monitoring unit, whether the tag for inspector is turned on and the location coordinates for inspector are input in real time and allowing, by the work end monitoring unit, the location coordinates for inspector not to be output on the display panel when the tag for inspector is turned off and the location coordinates for inspector are not input in real time.

According to an embodiment, the allowing of the location coordinates for inspector not to be output on the display panel may include releasing a work section, a lane of which is cut, by means of a setting of the inspection scheduling operation unit, when state information of a semiconductor manufacturing facility indicates a normal driving state.

According to an embodiment, the repeater may be composed of a plurality of repeaters, each of which includes location coordinates for repeater. The converting of the location information for inspector into the location coordinates for inspector may include converting, by the location information converter, the location information for inspect into the location coordinates for inspect by means of an intersection point of relative distances from the tag for inspect on location coordinates for each of the plurality of repeaters.

According to an embodiment, the receiving of the location information for inspector of the tag for inspector may include interworking, by the OHT control system, with the repeater to further receive location information for inspection product of a tag for inspection product. The converting of the location information for inspector into the location coordinates for inspector may include further converting, by the location information converter, the location information for inspection product, the location information being provided from the tag for inspection product, into location coordinates for inspection product in the map.

According to an embodiment, the repeater may be composed of a plurality of repeaters, each of which includes location coordinates for repeater. The converting of the location information for inspector into the location coordinates for inspector may include converting, by the location information converter, the location information for inspection product into the location coordinates for inspection product by means of an intersection point of relative distances from the tag for inspection product on location coordinates for each of the plurality of repeaters.

According to another embodiment, a management device for a substrate processing system may include a tag for inspector that transmits location information for inspector, a tag for inspection product coupled to an inspection product to transmit location information for inspection product, a repeater that interworks with the tag for inspector to relay the location information for inspector, interworks with the tag for inspection product to relay the location information for inspection product, and is composed of a plurality of repeaters, each of which includes location coordinates for repeater, an OHT control system including a location information converter that interworks with the repeater to receive the location information for inspector and the location information for inspection product, converts the location information for inspector into location coordinates for inspector, and converts the location information for inspection product into location coordinates for inspection product, and a display panel that displays the location coordinates for inspector and the location coordinates for inspection product in a map and outputs a rail for each section and a semiconductor manufacturing facility in the form of graphics in the map.

The location information converter may convert the location information for inspector into the location coordinates for inspector by means of an intersection point of relative distances from the tag for inspector on location coordinates for each of the plurality of repeaters.

The location information converter may convert the location information for inspection product into the location coordinates for inspection product by means of an intersection point of relative distances from the tag for inspection product on the location coordinates for each of the plurality of repeaters.

The OHT control system may further include a map interworking unit that interworks with the location information converter to receive location coordinates for inspector on an intersection point where three circular paths intersect with each other and output the received location coordinates for inspector on the intersection point in the form of a graphic icon on the map and interworks with the location information converter to receive location coordinates for inspection product on an intersection point where three circular paths intersect with each other and output the received location coordinates for inspection product on the intersection point in the form of a graphic icon on the map, an inspection scheduling operation unit that sets lane cut such that an OHT does not operate during an inspection start time and an inspection completion time in a work section within an inspection time, when setting the inspection start time, the inspection completion time, and the work section, and a departure alarm unit that interworks with the location information converter to receive location coordinates for inspector, the location coordinates being provided from the tag for inspector, interwork with the inspection scheduling operation unit to receive inspection section location coordinates of an inspection section where an inspector will perform inspection work, and generates an inspection departure alarm on the display panel, when the location coordinates for inspector deviate from a certain range of the inspection section location coordinates.

The tag for inspector may further include a power switch, may transmit the location information for inspector when the power switch is turned on, and may stop transmitting the location information for inspector when the power switch is turned.

the OHT control system may further include a work end monitoring unit that monitors whether the tag for inspector is turned on and location coordinates for inspector are input in real time and allows the location coordinates for inspector not to be output on the display panel when the tag for inspector is turned off and the location coordinates for inspector are not input in real.

The work end monitoring unit may receive information about a normal driving state or an abnormal driving state of a semiconductor manufacturing facility and may display the received information on the display panel.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, an embodiment for implementing the present disclosure will be described with reference to the accompanying drawings. In this case, when a certain part "includes" a certain component throughout the specification, it is considered to mean that it may further include other components, rather than controlling other components, unless otherwise stated. Furthermore, the term " . . . unit" used in the specification may refer to a unit of processing at least one function or operation when describing electronic hardware or electronic software, which is considered to mean one part, function, use, point, or driving element, when describing a mechanical device. Furthermore, hereinafter, the same configuration or a similar configuration will be described using the same reference number, and a duplicated description of the same component will be omitted.

Figure 1:
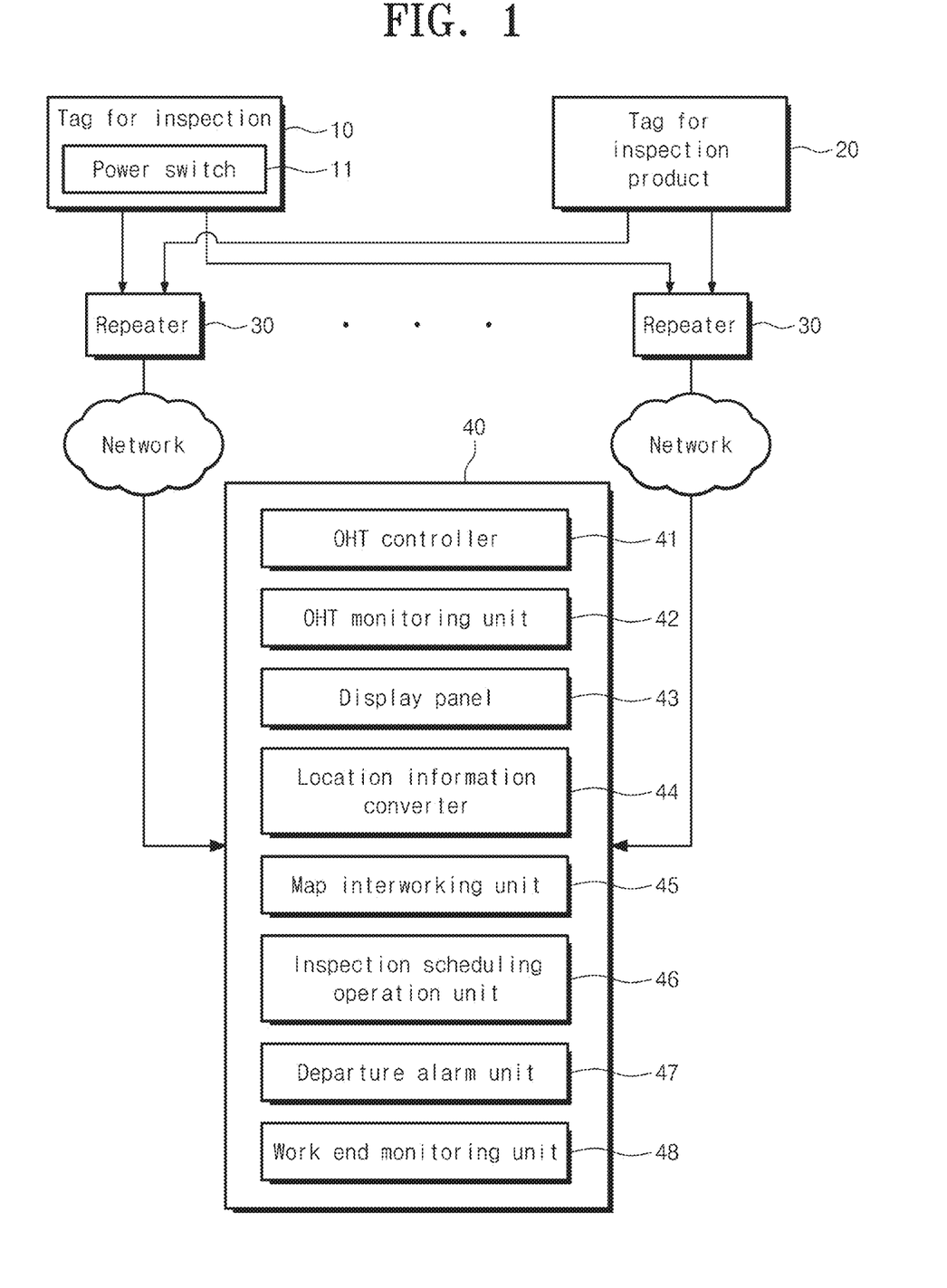
FIG. 1 is a block diagram of a management device for a substrate processing system according to an embodiment of the present disclosure.
Figure 2:
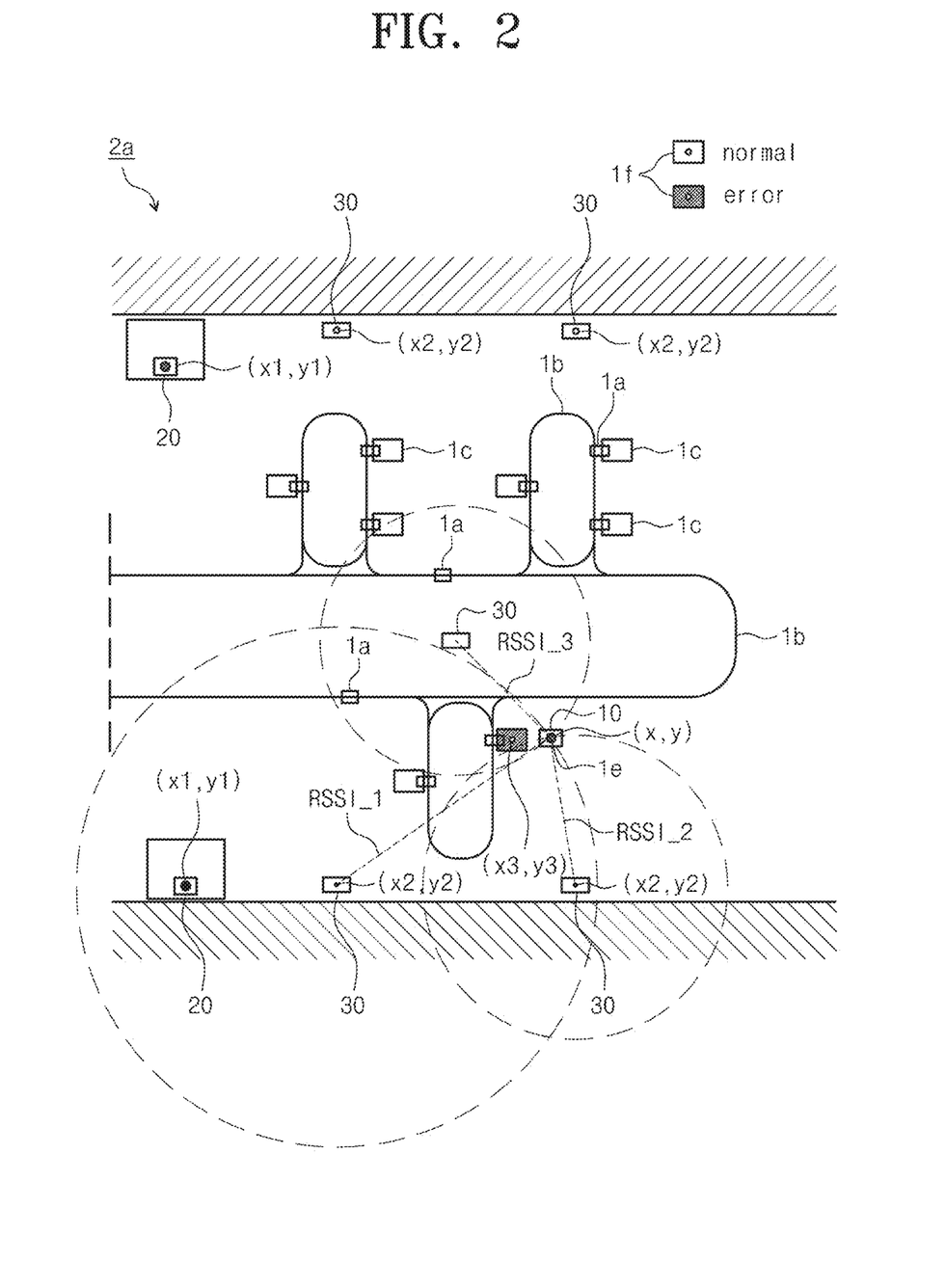
FIG. 2 is a drawing illustrating a configuration of a map output on a display panel illustrated in FIG. 1.

FIG. 1 is a block diagram of a management device for a substrate processing system according to an embodiment of the present disclosure. FIG. 2 is a drawing illustrating a configuration of a map output on a display panel illustrated in FIG. 1.

As illustrated in FIGS. 1 and 2, the management device for the substrate processing system according to an embodiment of the present disclosure may include a tag 10 for inspector, a tag 20 for inspection product, a repeater 30, and an OHT control system 40.

The tag 10 for inspector may be a portable communication device carried by an inspection worker upon inspection work to provide location information for inspector to inspect a semiconductor manufacturing facility 1c, which may transmit ID information for inspector, which is a unique identification number, and received signal strength indicator (RSSI) information for inspector. In this case, the tag 10 for inspector may transmit the unique ID information for inspector and the RSSI information for inspector to the repeater 30. The tag 10 for inspector may be used by being carried by the inspector upon working or being mounted on a safety helmet or the like of the inspector. Herein, the tag 10 for inspector may operate in a state where it is coupled to the safety helmet, a belt, or the like of the inspector.

Furthermore, the tag 10 for inspector may be equipped with a power switch 11 to transmit the ID information for inspector and the RSSI information for inspector when the power switch 11 is turned on and not to transmit the ID information for inspector and the RSSI information for inspector when the power switch 11 is turned off. Herein, the power switch 11 may be turned on by the worker when inspection work is started and may be turned off by the work when the inspection work is completed.

The tag 20 for inspection product may be a portable communication device coupled to an inspection product to provide location information for inspection product of the inspection product, which may transmit ID information for inspection product, which is a unique identification number, the location information for inspection product, and RSSI information for inspection product. In this case, the tag 20 for inspection product may transmit the unique ID information for inspection product and the RSSI information for inspection product to the repeater 30. The tag 20 for inspection product may be used by being attached to a product for inspection, such as a tool or an instrument, which is used upon inspection. Meanwhile, a data table for inspection product may be further configured on the OHT control system 40 such that a tool name, an instrument name, or the link is matched per ID information for inspection product in the tag 20 for inspection product, which is attached to the tool or the instrument. Herein, when the tag 20 for inspection product is output in the form of graphics on a display panel 43, the data table for inspection product may allow the tool name or the instrument name to be output on the display panel 43.

The repeater 30 may be a device which wirelessly relays communication between the tag 10 for inspector and the OHT control system 40, which communicates with the tag 10 for inspector through wireless communication such as Bluetooth, ultra wide band (UWB), or wireless local area network (WLAN) (wireless-fidelity (Wi-Fi)). The repeater 30 may interwork with the tag 10 for inspector to receive the ID information for inspector, which is the unique identification number, and the RSSI information for inspector, which are output from the tag 10 for inspector, and may transmit the ID information for inspector and the RSSI information for inspector to the OHT control system 40. Herein, the repeater 30 may be composed of a plurality of repeaters. Each of the plurality of repeater 30 may transmit the ID information for inspector, which is the unique identification number, and the RSSI information for inspector, which are output from the tag 10 for inspector, to the OHT control system 40.

Furthermore, the repeater 30 may wirelessly relay communication between the tag 20 for inspector and the OHT control system 40, through wireless communication such as Bluetooth, UWB, or WLAN (Wi-Fi). The repeater 30 may interwork with the tag 20 for inspection product to receive the ID information for inspection product, which is the unique identification number, and the RSSI information for inspection product, which are output from the tag 20 for inspection product, and may transmit the ID information for inspection product and the RSSI information for inspection product to the OHT control system 40. Herein, the repeater 30 may be composed of a plurality of repeaters. Each of the plurality of repeater 30 may transmit the ID information for inspection product, which is the unique identification number, and the RSSI information for inspection product, which are output from the tag 20 for inspection product, to the OHT control system 40.

Furthermore, each of the plurality of repeaters 30 may embed repeater location coordinates (x2, y2) together with a unique ID value and may transmit the repeater location coordinates (x2, y2) when transmitting the ID information for inspector, the RSSI information for inspector, the ID information for inspection product, and the RSSI information for inspection product. In this case, as shown in FIG. 2, the OHT control system 40 may embed a map 2a inside a factory, and the repeater location coordinates (x2, y2) may be set by being matched with actual installation locations of the repeaters 30 in the map 2a. Herein, the map 2a may be implemented with an image of pixels having grid coordinate values, and the repeater location coordinates (x2, y2) may be set to a grid coordinate value of a specific pixel value.

The OHT control system 40 may include an OHT controller 41, an OHT monitoring unit 42, a display panel 43, a location information converter 44, a map interworking unit 45, an inspection scheduling operation unit 46, a departure alarm unit 47, and a work end monitoring unit 48.

The OHT controller 41 may communicate with an OHT 1a and may control the OHT 1a to be driven and transmit logistics transport details.

The OHT monitoring unit 42 may monitor state information 1f, driving state information, and logistics loading and unloading information of the OHT 1a.

The display panel 43 may display location coordinates (x, y) for inspector of the tag 10 for inspector in the map 2a such that a field operator may see a location of the inspector. Furthermore, the display panel 43 may display location coordinates (x1, y1) for inspection product of the tag 20 for inspection product in the map 2a. Furthermore, when displaying the location coordinates (x, y) for inspector and the location coordinates (x1, y1) for inspection product in the map 2a, the display panel 43 may be configured to output the OHT 1a, a rail 1b for each section, the semiconductor manufacturing facility 1c, and the like in the form of graphics in the map 2a and relatively compare location information for inspector, location information for inspection product, and locations of the OHT 1a, the rail 1b for each section, and the semiconductor manufacturing facility 1c, such that the field operator who operates the OHT 1a may visually and easily identify a location of the inspector and a location of the inspection product.

The location information converter 44 may convert the location information for inspector, which is provided from the tag 10 for inspector, into the location coordinates (x, y) for inspector in the map 2a. A description will be given of an example where the location information converter 44 converts the location information provided from the tag 10 for inspector into the location coordinates (x, y) for inspector in the map 2a. First of all, in a state where the location information converter 44 stores the repeater location coordinates (x2, y2) of the map 2a, the location information converter 44 may interwork with the plurality of repeaters 30 to receive the ID information for inspector, which is the unique identification number, and the RSSI information for inspector, which are output from the tag 10 for inspector.

Furthermore, as the plurality of repeaters 30 communicate with the one tag 10 for inspector, the location information converter 44 may receive a plurality of pieces of ID information for inspector and a plurality of pieces of RSSI information for inspector. In this case, the location information converter 44 may convert each of the plurality of pieces of RSSI information into distance information by means of a distance conversion formula, when the plurality of pieces of ID information for inspector are the same as each other. Herein, the distance conversion formula may correspond to a conversion graph for setting a rate of change in signal strength of the RSSI information for inspector by experimental values depending on the distance between the tag 10 for inspector and the repeater 30. For example, when the measured distance between the tag 10 for inspector and the repeater 30 is 20 m when signal strength 1 RSSI_1 of the RSSI information for inspector is −50 dB, when the measured distance between the tag 10 for inspector and the repeater 30 is 10 m when signal strength 2 RSSI_2 of the RSSI information for inspector is −45 dB, and when the measured distance between the tag 10 for inspector and the repeater 30 is 8 m when signal strength 3 RSSI_3 of the RSSI information for inspector is −43 dB, the location information converter 44 may store distance information measured according to the RSSI information for inspector and may interpolate numerical values to convert the signal strength of the RSSI information for inspector and the measured distances into the distance conversion formula.

The distance conversion formula converted by the location information converter 44 may be used to identify a location of the tag 10 for inspector. In detail, when each of at least three repeaters 30 receives ID information for inspector and the RSSI information for inspector, which are transmitted from any one tag 10 for inspector, and transmits the ID information for inspector and the RSSI information for inspector together with the repeater location coordinates (x2, y2) to the location information converter 44, the location information converter 44 may output a distance converted by the distance conversion formula on location coordinates of each of the three repeaters 30. In this case, the distance converted by the distance conversion formula may be formed as a circular path. Each of the three repeaters 30 may generate three circular paths. At this time, the location information converter 44 may recognize an intersection point 1e, at which the three circular paths intersect with one another, as location coordinates (x, y) for inspector of the tag 10 for inspector.

The map interworking unit 45 may interwork with the location information converter 44 to receive the location coordinates (x, y) for inspector on the intersection point 1e at which the three circular paths intersect with one another and may output the location coordinates (x, y) for inspector on the received intersection point 1e n the form of a graphic icon on the map 2a of the display panel 43. Herein, the display panel 43 on which the map 2a is output may interwork with the OHT control system 40. In this case, the map interworking unit 45 may be implemented to output the OHT 1a, the rail 1b for each section, the semiconductor manufacturing facility 1c, and the like in the form of graphics, as well as the graphic icon for the location of the tag 10 for inspector, such that the field operator compares the OHT 1a, the rail 1b for each section, the semiconductor manufacturing facility 1c, and the like inside the factory to know a relative location. Thus, the field operator may identify the graphic icon for the location coordinates (x, y) for inspector in the map 2a output on the display panel 43 to know whether the inspector is in any location.

Furthermore, the location information converter 44 may convert the location information provided from the tag 20 for inspection product into location coordinates (x1, y1) for inspection product in the map 2a. Herein, as an example of converting the location information provided from the tag 20 for inspection product into the location coordinates (x1, y1) for inspection product in the map 2a, the tag 20 for inspection product may transmit ID information for inspection product and RSSI information for inspection product to the location information converter 44. Herein, the location information converter 44 may output the location coordinates (x1, y1) for inspection product, which are generated by a distance conversion formula in the same manner as the above-mentioned tag 10 for inspector, in the form of an icon in the map 2a of the display panel 43. In this case, because the tag 20 for inspection product differs in only ID information from the tag 10 for inspector, differs in only displayed icon or recognition information from the tag 10 for inspector, and is the same in a manner which converts location information as the tag 10 for inspector, a duplicated description thereof will be omitted. As such, the location information converter 44 may identify a location of a product for inspection in real time as the location coordinates (x1, y1) for inspection product of the tag 20 for inspection product appear on the display panel 43, thus easily managing the product for inspection.

When setting an inspection start time, an inspection completion time, and a work section, the inspection scheduling operation unit 46 may set lane cut such that the OHT 1a does not operate during the inspection start time and the inspection completion time in the work section within an inspection time. The inspection scheduling operation unit 46 may be set as the field operator directly manipulates an input device (not shown) for control of the OHT control system 40.

The departure alarm unit 47 may interwork with the location information converter 44 to receive the location coordinates (x, y) for inspector, which is provided from the tag 10 for inspector, and may interwork with the inspection scheduling operation unit 46 to receive inspection section location coordinates (x3, y3) of an inspection section where the inspector will perform inspection work. In this case, the departure alarm unit 47 may compare the location coordinates (x, y) for inspector with the inspection section location coordinates (x3, y3) and may generate an inspector departure alarm on the display panel 43, when the location coordinates (x, y) for inspector deviate from a certain range of the inspection section location coordinates (x3, y3). Thus, the field operator who manages the OHT control system 40 may determine whether the inspector normally works in real time by means of the departure alarm to take action in real time.

The work end monitoring unit 48 may monitor whether the tag 10 for inspector is turned on and the location coordinates (x, y) for inspector are input in real time. When the tag 10 for inspector is turned off and the location coordinates (x, y) for inspector are not input in real time, the work end monitoring unit 48 may allow the location coordinates (x, y) for inspector not to be output on the display panel 43. Furthermore, when the location coordinates (x, y) for inspector are not output on the display panel 43, the work end monitoring unit 48 may output a work end alarm on the display panel 43. Thus, the field operator who manages the OHT control system 40 may visually identify the work end alarm displayed on the map 2a and that the location coordinates (x, y) for inspector are not output to determine that the inspection work is ended.

Furthermore, the work end monitoring unit 48 may interwork with the semiconductor manufacturing facility 1*c* to be inspected in the work section to receive the state information 1*f* of the semiconductor manufacturing facility 1*c*. In this case, the state information 1*f* of the semiconductor manufacturing facility 1*c* may include a normal driving state and an abnormal driving state which requires inspection as an error or the like occurs in the semiconductor manufacturing facility 1*c*. In this case, the work end monitoring unit 48 may interwork with the map interworking unit 45 to output the state information 1*f* about whether the semiconductor manufacturing facility 1*c* is in the normal driving state or the abnormal driving state to the map interworking unit 45. The map interworking unit 45 may output state information of the semiconductor manufacturing facility 1*c* in the form of graphics to display the state information together with the map 2*a* on the display panel 43. Thus, the field operator who manages the OHT control system 40 may visually identify the state information if displayed on the map 2*a* to identify the normal driving state of the semiconductor manufacturing facility 1*c*.

Hereinafter, a description will be given of a management method for a substrate processing system according to an embodiment of the present disclosure.

Figure 3:
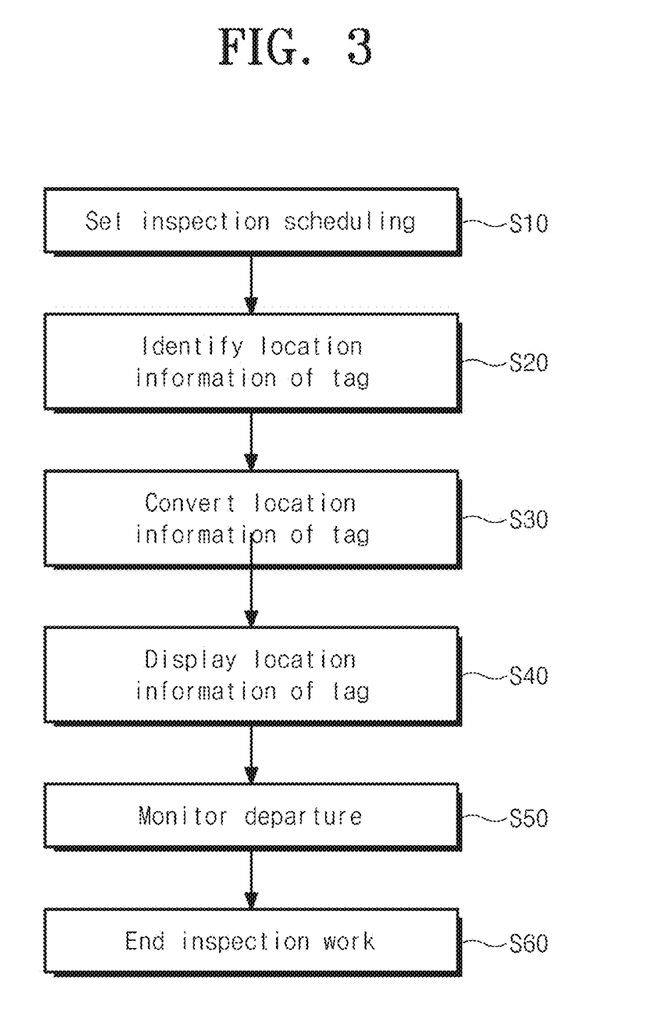
FIG. 3 is a flowchart of a management method for a substrate processing system according to an embodiment of the present disclosure.

FIG. 3 is a flowchart of a management method for a substrate processing system according to an embodiment of the present disclosure.

As shown in FIG. 3, the management method for the substrate processing system according to an embodiment of the present disclosure may include setting (S10) inspection scheduling, identifying (S20) location information of a tag, converting (S30) the location information of the tag, displaying (S40) the location information of the tag, monitoring (S50) departure, and ending (S60) inspection work.

First of all, in operation S10, an inspection scheduling operation unit 46 of FIG. 1 may set an inspection start time and an inspection completion time such that an OHT 1*a* of FIG. 2 becomes a lane cut state during the inspection start time and the inspection completion time in a work section of a semiconductor manufacturing facility 1*c* to be inspected by an inspector.

In operation S20, in a state where an OHT control system 40 of FIG. 1 converts repeater location coordinates (x2, y2) into location information in a map 2*a* of FIG. 2, the OHT control system 40 may receive ID information for inspector and RSSI information for inspector of a tag 10 for inspector from each repeater 30 and may receive ID information for inspection product and RSSI information for inspection product of a tag 20 for inspection product from the repeater 30.

In operation S30, a location information converter 44 of FIG. 1 may convert location information for inspector, which is provided from the tag 10 for inspector, into location coordinates (x, y) for inspector in the map 2*a* and may convert location information provided from the tag 20 for inspection product into location coordinates (x1, y1) for inspection product in the map 2*a*. In this case, the scheme which converts the location information provided from the tag 10 for inspector and the tag 20 for inspection product into the location coordinates in the map 2*a* may be a scheme where the tag 10 for inspector and the tag 20 for inspection product directly provides location information or a scheme where the location information converter 44 receives location information of the repeater 30 together with ID information for inspector, ID information for inspection product, RSSI information for inspector, and RSSI information for inspection product and recognizes an intersection point 1*e* where three circular paths generated by a distance conversion formula intersect with one another as the location coordinates (x, y) for inspector or the location coordinates (x1, y1) for inspection product of the tag 10 for inspector.

In operation S40, the location information converter 44 may form the location coordinates (x, y) for inspector and the location coordinates (x1, y1) for inspection product in the map 2*a* for the tag 10 for inspector and the tag 20 for inspection product in the form of a graphic icon on the map 2*a* and may output the location coordinates (x, y) for inspector and the location coordinates (x1, y1) for inspection product on a display panel 43 interworking with the OHT control system 40. In this case, the OHT 1*a*, a rail 1*b* for each section, the semiconductor manufacturing facility 1*c* may be output in the form of graphics on the map 2*a* to relatively easily know locations of the tag 10 for inspector and the tag 20 for inspection product. In this case, a field operator which operates the OHT control system 40 may see the graphic icons for the locations of the tag 10 for inspector and the tag 20 for inspection product, which are output on the display panel 43, to easily know whether an inspector is at any location and whether a product for inspection is disposed at any location.

In operation S50, in a state where a departure alarm unit 47 of FIG. 1 receives the location coordinates (x, y) for inspector from the location information converter 44 and interworks with an inspection scheduling operation unit 46 of FIG. 1 to receive inspection section location coordinates (x3, y3) where the inspector will perform inspection work, the departure alarm unit 47 may compare the location coordinates (x, y) for inspector with the inspection section location coordinates (x3, y3) and may generate an inspector departure alarm on the display panel 43, when the location coordinates (x, y) for inspector deviate from a certain range of the inspection section location coordinates (x3, y3). Thus, the field operator who manages the OHT control system 40 may determine whether the inspector normally works in real time by means of the departure alarm in operation S50 to take action in real time.

In operation S60, when the inspector ends the work and turns off a power switch 11 of the tag 10 for inspector, a work end monitoring unit 48 of FIG. 1 may generate a work end alarm in a state where the location coordinates (x, y) for inspector are not output on the display panel 43. In this case, a field manager who operates the OHT control system 40 may identify state information if of the semiconductor manufacturing facility 1*c*, which is output on the display panel 43, by means of the work end monitoring unit 48 and may release the lane cut state of the work section when the state information if of the semiconductor manufacturing facility 1*c* indicates a normal driving state. In other words, the inspector who inspects the semiconductor manufacturing facility 1*c* may notify the field manager who operates the OHT control system 40 of a work end time point, by means of only work where the power switch 11 of the tag 10 for inspector is turned off, without directly moving to the field manager who operates the OHT control system 40.

Thus, when the inspector performs inspection work of the semiconductor manufacturing facility 1*c* using the OHT 1*a*, because an operation worker in charge of the OHT control system 40 is able to know an inspection work progress state and the inspection work end state in real time, a management device for a substrate processing system and a management method for the substrate processing system according to an embodiment of the present disclosure may release the lane cut state of the OHT without movement of the inspector.

Furthermore, because the inspector or the field operator are able to know the location of a product for inspection in real time, the management method for the substrate processing system according to an embodiment of the present disclosure may very easily manage the product for inspection.

An embodiment of the present disclosure may release an OHT lane-cut state without movement of an inspector, as an operation worker in charge of an OHT control system may know an inspection work progress state and an inspection work end state in real time, when the inspector performs inspection work of a semiconductor manufacturing facility using an OHT.

Furthermore, an embodiment of the present disclosure may very easily manage a product for inspection, as the inspector or the field operator may know a location of the product for inspection in real time.

As described above, the present disclosure has been described by specific details such as specific components, limited embodiments, and drawings, but these are provided to help a more general understanding of the present disclosure, and the present disclosure is not limited to the above embodiments. Those skilled in the art in the field to which the present disclosure pertains may make various modifications and variations from these descriptions.

Thus, the spirit of the present disclosure should not be limited to the described embodiments, and the claims to be described later and all modifications equivalent to these claims belong to the scope of the present disclosure.

What is claimed is:

1. A management device for a substrate processing system, the management device comprising:
a tag for inspector configured to transmit location information for inspector;
a tag for inspection product coupled to an inspection product and configured to provide location information for inspection product;
a repeater configured to interwork with the tag for inspector to relay the location information for inspector and interwork with the tag for inspection product to relay the location information for inspection product; and
an overhead hoist transport (OHT) control system including a location information converter, the location information converter configured to interwork with the repeater to receive the location information for inspector and the location information for inspection product, convert the location information for inspector into location coordinates for inspector, and convert the location information for inspection product into location coordinates for inspection product.

2. The management device of claim 1, wherein
the repeater includes a plurality of repeaters, each of which includes location coordinates for repeater, and
the location information converter is configured to convert the location information for inspector into the location coordinates for inspector by means of an intersection point of relative distances from the tag for inspector on location coordinates for each of the plurality of repeaters.

3. The management device of claim 2, wherein the OHT control system further includes a display panel configured to display the location coordinates for inspector in a map and output a rail for each section and a semiconductor manufacturing facility in a form of graphics in the map.

4. The management device of claim 3, wherein the OHT control system further includes a map interworking unit configured to interwork with the location information converter to receive location coordinates for inspector on an intersection point where three circular paths intersect with each other and output the received location coordinates for inspector on the intersection point on the map in a form of a graphic icon.

5. The management device of claim 1, wherein
the repeater includes a plurality of repeaters, each of which includes location coordinates for repeater, and
the location information converter configured to convert the location information for inspection product into the location coordinates for inspection product by means of an intersection point of relative distances from the tag for inspection product on location coordinates for each of the plurality of repeaters.

6. The management device of claim 5, wherein the OHT control system further includes a display panel configured to display the location coordinates for inspection product in a map and output a rail for each section and a semiconductor manufacturing facility in a form of graphics in the map.

7. The management device of claim 1, wherein the OHT control system further includes an inspection scheduling operation unit configured to set lane cut such that an OHT does not operate during an inspection start time and an inspection completion time in a work section within an inspection time, when setting the inspection start time, the inspection completion time, and the work section.

8. The management device of claim 7, wherein the OHT control system further includes a departure alarm unit configured to interwork with the location information converter to receive location coordinates for inspector, the location coordinates being provided from the tag for inspector, interwork with the inspection scheduling operation unit to receive inspection section location coordinates of an inspection section where an inspector will perform inspection work, and generate an inspector departure alarm on a display panel, when the location coordinates for inspector deviate from a certain range of the inspection section location coordinates.

9. The management device of claim 1, wherein the tag for inspector further includes a power switch, is configured to transmit the location information for inspector when the power switch is turned on, and stop transmitting the location information for inspector when the power switch is turned off.

10. The management device of claim 9, wherein the OHT control system further includes a work end monitoring unit configured to monitor whether the tag for inspector is turned on and location coordinates for inspector are input in real time and allow the location coordinates for inspector not to be output on a display panel when the tag for inspector is turned off and the location coordinates for inspector are not input in real time.

11. The management device of claim 10, wherein the work end monitoring unit is configured to receive information about a normal driving state or an abnormal driving state of a semiconductor manufacturing facility and display the received information on the display panel.

12. A management device for a substrate processing system, the management device comprising:
a tag for inspector configured to transmit location information for inspector;
a tag for inspection product coupled to an inspection product and configured to transmit location information for inspection product;
a repeater configured to interwork with the tag for inspector to relay the location information for inspector, interwork with the tag for inspection product to relay the location information for inspection product, and composed of a plurality of repeaters, each of which includes location coordinates for repeater;
an OHT control system including a location information converter configured to interwork with the repeater to receive the location information for inspector and the location information for inspection product, convert the location information for inspector into location coordinates for inspector, and convert the location information for inspection product into location coordinates for inspection product; and
a display panel configured to display the location coordinates for inspector and the location coordinates for inspection product in a map and output a rail for each section and a semiconductor manufacturing facility in the form of graphics in the map,
wherein the location information converter converts the location information for inspector into the location coordinates for inspector by means of an intersection point of relative distances from the tag for inspector on location coordinates for each of the plurality of repeaters,
wherein the location information converter converts the location information for inspection product into the location coordinates for inspection product by means of an intersection point of relative distances from the tag for inspection product on the location coordinates for each of the plurality of repeaters,
wherein the OHT control system further includes:
a map interworking unit configured to interwork with the location information converter to receive location coordinates for inspector on an intersection point where three circular paths intersect with each other and output the received location coordinates for inspector on the intersection point in the form of a graphic icon on the map and interwork with the location information converter to receive location coordinates for inspection product on an intersection point where three circular paths intersect with each other and output the received location coordinates for inspection product on the intersection point in the form of a graphic icon on the map,
an inspection scheduling operation unit configured to set lane cut such that an OHT does not operate during an inspection start time and an inspection completion time in a work section within an inspection time, when setting the inspection start time, the inspection completion time, and the work section, and
a departure alarm unit configured to interwork with the location information converter to receive location coordinates for inspector, the location coordinates being provided from the tag for inspector, interwork with the inspection scheduling operation unit to receive inspection section location coordinates of an inspection section where an inspector will perform inspection work, and generate an inspection departure alarm on the display panel, when the location coordinates for inspector deviate from a certain range of the inspection section location coordinates,
wherein the tag for inspector further includes a power switch, transmits the location information for inspector when the power switch is turned on, and stops transmitting the location information for inspector when the power switch is turned,
wherein the OHT control system further includes a work end monitoring unit configured to monitor whether the tag for inspector is turned on and location coordinates for inspector are input in real time and allow the location coordinates for inspector not to be output on the display panel when the tag for inspector is turned off and the location coordinates for inspector are not input in real, and
wherein the work end monitoring unit receives information about a normal driving state or an abnormal driving state of a semiconductor manufacturing facility and displays the received information on the display panel.

\* \* \* \* \*